(12) United States Patent
Achong et al.

(10) Patent No.: US 7,593,591 B2
(45) Date of Patent: Sep. 22, 2009

(54) METHOD AND APPARATUS FOR INCREASING CONTRAST IN A DIGITAL IMAGE

(75) Inventors: Jeffrey Matthew Achong, Brampton (CA); Hui Zhou, Toronto (CA); Ian Clarke, North York (CA)

(73) Assignee: Seiko Epson Corporation, Tokyo (JP)

( * ) Notice: Subject to any disclaimer, the term of this patent is extended or adjusted under 35 U.S.C. 154(b) by 400 days.

(21) Appl. No.: 11/198,055

(22) Filed: Aug. 5, 2005

(65) Prior Publication Data

US 2007/0031059 A1 Feb. 8, 2007

(51) Int. Cl.
*G06K 9/40* (2006.01)
*G06K 9/38* (2006.01)

(52) U.S. Cl. ........................ 382/274; 382/172
(58) Field of Classification Search ................. 382/274
See application file for complete search history.

(56) References Cited

U.S. PATENT DOCUMENTS

| | | | |
|---|---|---|---|
| 3,629,835 A | 12/1971 | Brown et al. | |
| 3,937,928 A | 2/1976 | Sasaki et al. | |
| 3,939,327 A | 2/1976 | Humphrey | |
| 4,020,327 A | 4/1977 | Geary et al. | |
| 4,845,770 A | 7/1989 | Koshida | |
| 5,050,231 A | 9/1991 | Watanabe et al. | |
| 5,555,313 A * | 9/1996 | Zheng et al. | 382/112 |
| 5,982,926 A * | 11/1999 | Kuo et al. | 382/167 |
| 6,043,900 A * | 3/2000 | Feng et al. | 358/1.9 |
| 6,236,751 B1 * | 5/2001 | Farrell | 382/168 |
| 6,628,808 B1 | 9/2003 | Bach et al. | |
| 6,731,821 B1 | 5/2004 | Maurer et al. | |
| 7,116,446 B2 * | 10/2006 | Maurer | 358/3.08 |
| 2003/0012437 A1 * | 1/2003 | Zaklika et al. | 382/169 |
| 2006/0083425 A1 * | 4/2006 | Moldvai | 382/169 |
| 2006/0268180 A1 * | 11/2006 | Chou | 348/673 |
| 2007/0009167 A1 * | 1/2007 | Dance et al. | 382/254 |

OTHER PUBLICATIONS

Rafael C. Gonzalez, Digital Image Processing, Nov. 2001, Prentice Hall, 2/E, pp. 89,90,95,100,102, 326,327.*
Rafael C. Gonzalez, Digital Image Processing, Nov. 2001, Prentice Hall, 2/E, pp. 596-600.*
Rafael C. Gonzalez, Digital Image Processing, Nov. 2001, Prentice Hall, 2/E, pp. 84-87.*
Rafael C. Gonzalez, Digital Image Processing, Nov. 2001, Prentice Hall, 2/E, pp. 91-94, 96-99.

\* cited by examiner

*Primary Examiner*—Vikkram Bali
*Assistant Examiner*—Max Shikhman

(57) ABSTRACT

A method of enhancing contrast in a digital image comprises isolating pixels of the image having intensities falling within a low intensity range, determining at least one feature of the pixel distribution with the range and adjusting intensities of pixels in the image to make the pixels within the range more visually distinct. An apparatus for enhancing contrast in a digital image is also provided.

2 Claims, 8 Drawing Sheets

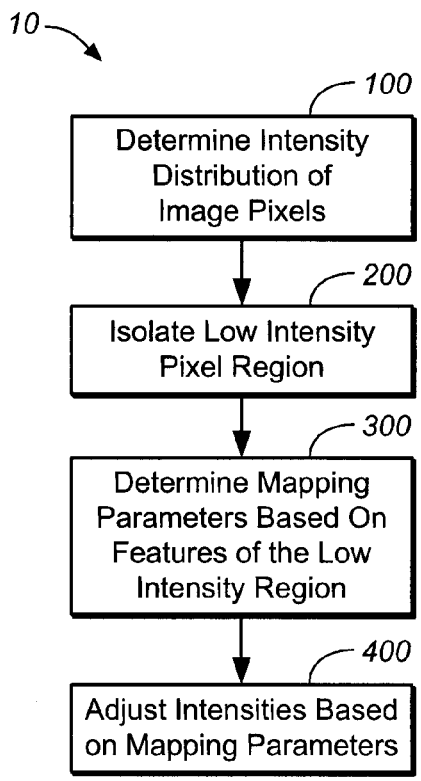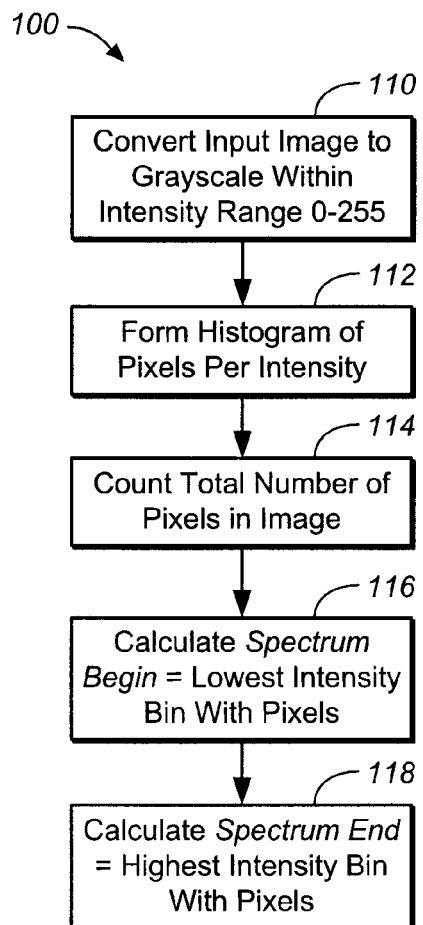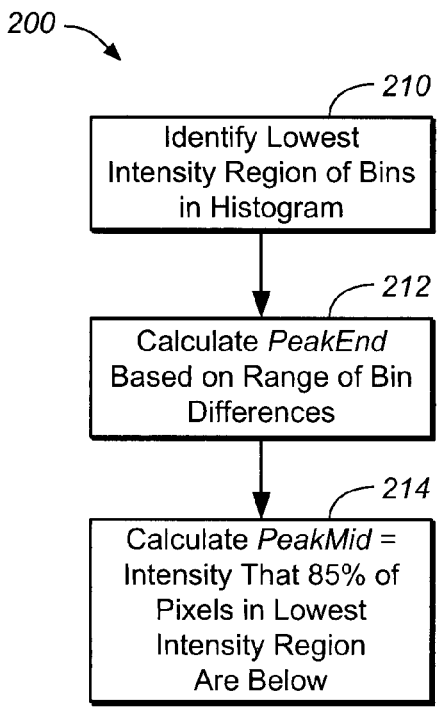
FIG. 1
FIG. 2
FIG. 3

METHOD AND APPARATUS FOR INCREASING CONTRAST IN A DIGITAL IMAGE

FIELD OF THE INVENTION

The present invention relates generally to image processing and in particular to a method and apparatus for increasing contrast in a digital image.

BACKGROUND OF THE INVENTION

Digital scanners are well-known devices for taking images of articles such as paper documents and objects including for example payment cards and converting the images into electronic files. Although scanners have a variety of general and specific uses, they are most commonly used to scan documents in order to consolidate records, create paperless work environments and/or facilitate the electronic transmission of information.

Scanners vary in design and sophistication, but generally all comprise an elongate light source and a grid or series of sensors for receiving light that is reflected off of the surface of the article being scanned. The data from the sensors is collected by a processor operating under control of scanner software and stored as a digital image file typically in JPEG, BMP or GIF format. If the scanner is coupled to a computer or to a local or wide area network, the digital image file is typically made available to the computer or to network devices for storage and/or further processing.

When scanning credit cards or other objects having embossed (stamped) characters thereon using a general-purpose scanner, some challenges present themselves. For example, due to the height of embossed characters, the distance between the sensors and the base surface of the card being scanned is increased. This increase in distance consequently produces images that are significantly lower in overall intensity because of the decrease in the amount of light received by the sensors. In other words, the images tend to have pixels with intensity values that lean toward the dark region of the greyscale spectrum. In some cases, the edges of embossed characters that extend perpendicular to the longitudinal axis of the light source brightly stand out in the images, making the embossed characters easy to discern from the background. Unfortunately, more often the scanner will fail to capture these bright edge contrasts, resulting in a dark image having characters therein that are very difficult to discern from the background.

Prior art attempts to improve the contrast in images of articles having embossed characters thereon have, in some cases, focused on improvements to the image capture hardware and sensor configurations. For example, U.S. Pat. No. 3,937,928 to Sasaki et al. discloses an embossed card reader comprising a card transport table upon which a slit plate having two slits is placed. When a card having embossed characters is supported by the transport table, the card is illuminated through one of the slits. Light reflecting off the card passes through the other slit to an array of parallel aligned, light-sensitive elements. The light-sensitive elements are sequentially scanned while light is passed over the embossed characters on the card in order to recognize the characters on the card.

U.S. Pat. No. 3,939,327 to Humphrey discloses an optical reading apparatus and method for identifying alpha-numeric indicia on credit cards and the like. Indicia are read by conducting light from a source to the surface of the credit card by a light conducting rod. Light reflected from the surface is conducted to a photo sensor by a second light conducting rod. The first and second light conducting rods are arranged so that reflected light is transmitted to the photo sensor when incident light from the source impinges on the planar surface of the credit card. However, when light from the source impinges on an embossed or debossed portion of indicia, it is no longer reflected to the second light conducting rod. Hence the photo sensor produces a change in its output indicative of the absence of light allowing the indicia on the card to be recognized.

Prior art attempts to improve the contrast in images of articles having embossed characters thereon have also focused on improvements to image post-processing. For example, U.S. Pat. No. 6,628,808 to Bach et al. discloses a method for increasing the reliability of optical character verification systems, particularly when used with images where there is no sharp division between the foreground and the background. With such images, it is difficult to resolve a source grayscale image into a simple bi-level image. During the method, pixel intensity is corrected for the purpose of subsequent character recognition by normalizing the pixel intensities across an available dynamic range.

U.S. Pat. No. 6,731,821 to Maurer et al. discloses a system and method of increasing compressibility of image data by selectively smoothing the image data while preserving edges using variable contrast stretching. While smoothing is performed using an edge preserving image smoothing/de-noising technique, sharpening of edges is performed using variable contrast stretching based on the pre-smoothed image data. During the method, the dynamic intensity range of the entire image over the complete dynamic range of the image capturing device is normalized.

The above described methods focus particularly on making character data in images more machine-readable, primarily for the purpose of optical character recognition (OCR) and file compression. Unfortunately these techniques do not generally yield images that are significantly easier for humans to read.

It is therefore an object of the present invention to provide a novel method and apparatus for increasing contrast in a digital image.

SUMMARY OF THE INVENTION

Accordingly in one aspect there is provided a method of increasing contrast in a digital image comprising:

determining the intensity distribution of pixels forming said digital image;

identifying a low intensity pixel range in said distribution; and based on at least one feature of said low intensity pixel range, adjusting intensities of pixels in said image.

In one embodiment, during the adjusting, pixel intensities are stretched thereby to space pixels at different intensities apart. A spacing factor may be used. The low intensity pixel range includes a predominate number of the low intensity pixels in the image. During the adjusting, at least a portion of the low intensity pixel range is re-scaled. During re-scaling, pixels having intensity values in a specified range are stretched towards a threshold value. In one embodiment, the at least one feature is the position of a threshold intensity value along the low intensity pixel range. When the threshold intensity value is above a designated value, pixels having intensities above the low intensity pixel region are re-scaled. When the threshold intensity value is below the designated value, pixels in the low intensity pixel range are adjusted.

According to another aspect there is provided a method of enhancing contrast in a digital image comprising:

isolating pixels of said image having intensities falling within a low intensity range;

determining at least one feature of the pixel distribution with said range; and adjusting intensities of pixels in said image to make the pixels within said range more visually distinct.

During the adjusting, pixels at different intensity levels are spaced apart. When the low intensity range includes a concentration of pixels having similar intensities, pixels across at least a portion of the range are spaced apart. When the concentration reaches a threshold, all of the pixels across the range are spaced apart.

According to yet another aspect there is provided an apparatus for increasing contrast in a digital image comprising:

a pixel intensity determiner determining the intensity distribution of pixels forming said digital image and identifying a low intensity pixel range in said distribution; and a pixel intensity adjuster adjusting, based on at least one feature of said low intensity pixel range, intensities of pixels in said image.

According to yet another aspect of the present invention there is provided an apparatus for enhancing contrast in a digital image comprising:

means for isolating pixels of said image having intensities falling within a low intensity range;

means for determining at least one feature of the pixel distribution with said range; and means for adjusting intensities of pixels in said image to make the pixels within said range more visually distinct.

According to still yet another aspect there is provided a computer readable medium embodying a computer program for enhancing contrast in a digital image, said computer program comprising:

computer program code for isolating pixels of said image having intensities falling within a low intensity range;

computer program code for determining at least one feature of the pixel distribution with said range; and computer program code for adjusting intensities of pixels in said image to make the pixels within said range more visually distinct.

According to still yet another aspect there is provided a computer readable medium embodying a computer program for enhancing contrast in a digital image, said computer program comprising:

computer program code for determining distribution of pixels forming said digital image;

computer program code for identifying a low intensity pixel range in said distribution; and computer program code for adjusting, based on at least one feature of said low intensity pixel range, intensities of pixels in said image.

The method and apparatus for increasing contrast in a digital image provide intensity adjustments that are based on features of the low intensity pixel range in the intensity distribution of pixels forming the image. As a result, pixel intensity adjustments are keyed to the portions of the image requiring it, and to the extent required. This yields advantages over prior art post-processing methods in that brightness and contrast over-adjustments are reduced.

BRIEF DESCRIPTION OF THE DRAWINGS

Embodiments will now be described more fully with reference to the accompanying drawings, in which:

FIG. 1 is a flowchart showing the general steps performed during contrast enhancement in a digital image;

FIG. 2 is a flowchart showing the steps performed during pixel intensity distribution determination;

FIG. 3 is a flowchart showing the steps performed during lowest intensity peak feature identification;

DETAILED DESCRIPTION OF THE EMBODIMENTS

In the following description, an embodiment of a method, apparatus and computer program for increasing contrast in a digital image is provided. During contrast enhancement, the intensity distribution of pixels forming the digital image is determined. A low intensity pixel range in the pixel intensity distribution is identified. Based on at least one feature of the low intensity pixel range, intensities of pixels in the image are adjusted. Depending on the nature of the low intensity pixel range, the regions of image pixels and the extent by which the pixel intensities are adjusted vary. In this manner, the digital image is processed in a manner to make dense regions of low intensity pixels more visually distinct.

The contrast enhancing method and apparatus may be embodied in a software application including computer executable instructions executed by a processing unit such as a scanner, personal computer or other computing system environment. The software application may run as a stand-alone digital image editing tool or may be incorporated into other available digital image editing applications to provide enhanced functionality to those digital image editing applications. The software application may include program modules including routines, programs, object components, data structures etc. and be embodied as computer readable program code stored on a computer readable medium. The computer readable medium is any data storage device that can store data, which can thereafter be read by a computer system. Examples of computer readable medium include for example read-only memory, random-access memory, CD-ROMs, magnetic tape and optical data storage devices. The computer readable program code can also be distributed over a network including coupled computer systems so that the computer readable program code is stored and executed in a distributed fashion. Increasing contrast in an input digital image will now be described more fully with reference to FIGS. 1 to 6.

Figure 6:
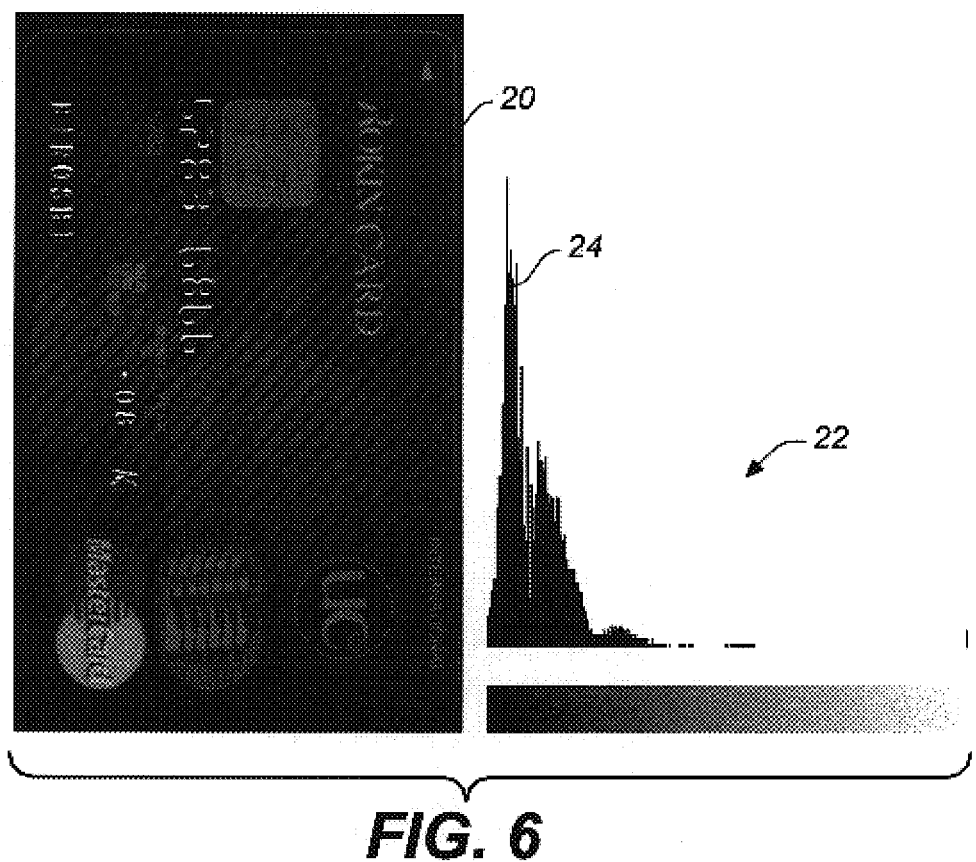
FIG. 6 shows an input digital image of a scanned payment card having embossed characters and an intensity distribution histogram of the pixels forming the input digital image.

Turning now to FIGS. 1 and 6, a flowchart showing the general steps performed during contrast enhancement in a digital image is shown and is generally identified by reference numeral 10. The method of increasing contrast is particularly suited to digital images of scanned articles having embossed characters thereon such as for example payment cards and the like so that the embossed characters can be easily discerned from the image background by a user viewing the image. During contrast enhancement, initially the intensity distribution of the pixels forming an input digital image 20 is determined (step 100). The region of the intensity distribution that includes a predominate number of the low intensity pixels is then identified together with features of the low intensity pixel region (step 200). In this manner, the low intensity pixel region is isolated. Based on the identified features of the low intensity pixel region, mapping parameters are determined that enable the isolated low intensity pixel region to be re-scaled if required (step 300). The determined mapping parameters are then used to adjust the intensities of pixels in the input digital image 20. In this manner, when the input digital image includes a significant number of low intensity pixels that are very close in value, the intensities of these pixels are stretched out making the pixels more visually distinct and yielding an output digital image having increased i.e. enhanced, contrast (step 400).

During pixel intensity distribution determination at step 100, each pixel in the input digital image 20 is firstly converted to a grayscale value in the range of 0-255 that represents the intensity of the pixel (see step 110 in FIG. 2). The number of pixels in the input digital image for each grayscale or pixel intensity value is determined and a histogram 22 is formed representing the intensity distribution of the pixels forming the input digital image (step 112).

The total number of pixels in the input digital image 20 is then counted (step 114). The lowest bin in the histogram 22 having pixels therein is identified and is used to set a variable SpectrumBegin (step 116). The highest bin in the histogram 22 having pixels therein is also identified and is used to set a variable SpectrumEnd (step 118). The variable SpectrumEnd is then examined to determine if it has a value greater than a reflection threshold (step 120). If the value of the variable SpectrumEnd is greater than the reflection threshold, the value of the variable SpectrumEnd is set to the reflection threshold. As will be appreciated by those of skill in the art, the value of the reflection threshold that is selected is dependent on the characteristics of the scanner used to capture the input digital image. Pixels having an intensity value above the reflection threshold are very likely to represent reflections from embossed characters on the article that was scanned. Pixel intensities above this value may have a negative effect when trying to determine the intensity of background low intensity pixels. Clipping the highest intensity pixel value in this manner deals with this potential problem.

During step 200, the region or range of bins of the intensity distribution histogram 22 that includes a predominate number of the low intensity pixels of similar value is firstly identified (step 210). For example, in FIG. 6 the low intensity range of bins in the intensity distribution histogram 22 is identified by reference numeral 24. In particular, the low intensity range of bins is deemed to extend from the bin associated with variable SpectrumBegin to a bin containing pixels having a high bounding pixel intensity value PeakEnd. The high bounding pixel intensity value PeakEnd is determined from a range of bin differences (step 212). In particular, to determine the pixel intensity value PeakEnd, the highest peak in the intensity distribution histogram over the pixel intensity or in range of 0 to 128 i.e. the bin containing the largest number of pixels is found. The bin associated with the highest peak defines an anchor point that is used to compare bin value or intensity differences. In particular, the intensity at the anchor point is compared with the intensities of successive bins until one of the following conditions is met:

i) the comparisons between the intensity at the anchor point and the intensities of eight (8) successive bins yield absolute differences less than or equal to 100 pixels, in which case PeakEnd is set to the anchor point;

ii) the comparisons between the intensity at the anchor point and a bin yields an absolute difference greater than 100 pixels in which case, the anchor point is incremented to the next bin and the comparison process is repeated for the new anchor point; or iii) the anchor point reaches the bin associated with intensity value 128, in which case PeakEnd is set to 128.

For example, if the anchor point is at bin 100, the intensity of bin 100 is initially compared with the intensity of bin 101. If the absolute difference is less than or equal to 100 pixels, the intensity of bin 100 is compared with the intensity of bin 102. If the absolute difference is less than or equal to 100 pixels, the intensity of bin 100 is compared with the intensity of bin 103. This process is repeated until either eight consecutive comparisons yield the same result, in which case PeakEnd is set to the anchor point, or a comparison result yields an absolute difference greater that 100 pixels, in which case the anchor point is incremented to bin 101 and the comparison process is recommenced.

With the low intensity range of bins 24 in the intensity distribution histogram determined, features of the pixels contained in the low intensity range of bins 24 are then calculated. First, the bin in the low intensity range of bins at the eighty-fifth percentile mark is determined and is used to set a variable PeakMid (step 214). In other words 85% of the pixels contained in the low intensity range of bins have pixel intensities below the value of the variable PeakcMid.

Figure 4:
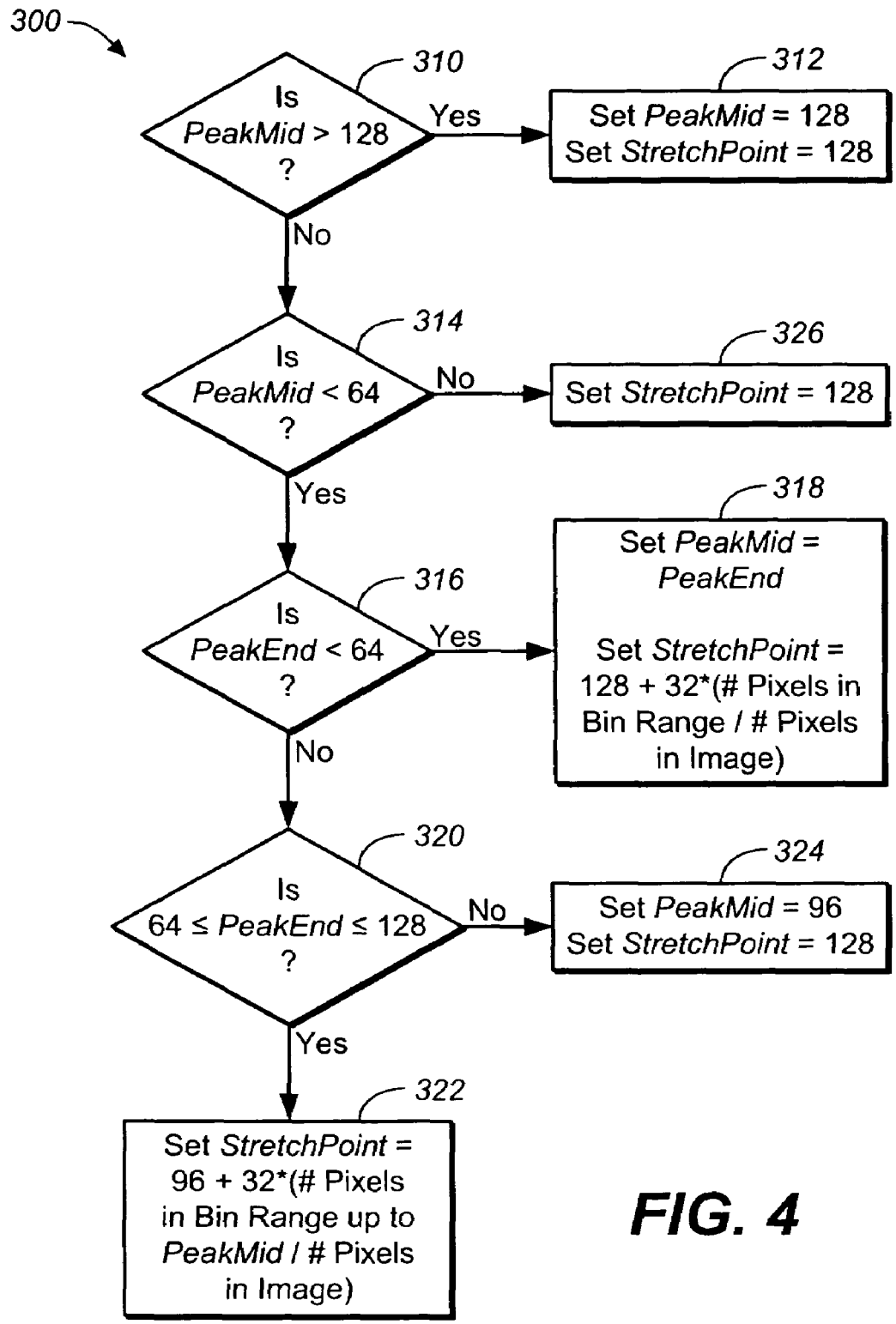
FIG. 4 is a flowchart showing the steps performed during mapping parameter determination.

With reference to FIG. 4, the steps performed during mapping parameter determination are shown. During step 300, the variable PeakAfid is examined to determine if it has a value greater than 128 (step 310). If the variable PeakMid is greater than 128, then the intensities of the pixels contained in the low intensity range of bins are deemed to be high enough such that characters and background details in the input digital image should be visually decipherable. In this case, the variable PeakMid is set to a value of 128 and a variable StretchPoint is also set to a value of 128 (step 312). The variable StretchPoint represents the intensity value to which a particular section of image pixels is stretched. In this case with the variables PeakMid and StretchPoint set to 128, pixels having intensities below 128 are not stretched and pixels having intensities between 128 and the value of the variable Spectrum End are stretched out to fill the 255 grayscale intensity range as will be further described.

At step 310, if the variable PeakMid is less than 128, the variable PeakMid is examined to determine if it has a value less than 64 (step 314). If the variable PeakMid is greater than 64, the variable StretchPoint is set at a value of 128 (step 326). With the variable PeakMid between 64 and 128, indicating that the range of bins 24 contains pixels having intensities leaning towards lower intensities, and the variable Stretch- Point set to 128, the variable Stretch Point is used to stretch pixels contained in the low intensity range of bins having intensities up to the value of the variable PeakMid, out to 128 as will be further described.

At step 314, if the variable PeakMid is less than 64, the variable PeakEnd is examined to determine if it has a value less than 64 (step 316). If the variable PeakEnd is also less than 64, indicating that the digital image contains a high concentration of low intensity pixels, the variable PeakMid is set to the value of the variable PeakEnd, and the variable StretchPoint is set to a value in the range of 128 to 160. The value between 128 and 160 to which the variable StretchPoint is set is based on the ratio of pixels contained in the low intensity range of bins 24 to the total pixels in the input digital image 20, according to the following formula:

$$\text{StretchPoint} = 128 + 32 * ((\text{\#Pixels in Bin Range}/\text{\#Pixels in Image})) \quad (1)$$

With the variable PeakAfid set to the value of variable PeakEnd and the variable StretchPoint in the range of 128 to 160, the variable StretchPoint is used to stretch all of the pixels contained in the low intensity range of bins 24 out to between 128 and 160 as will be further described.

At step 316, if the variable PeakEnd is greater than 64, the variable PeakEnd is examined to determine if it has a value in the range of 64 to 128 (step 320). If the variable PeakEnd falls within this range indicating that the digital image contains a concentration of low intensity pixels but possibly a sufficient number of pixels having visually acceptable intensities, the variable StretchPoint is set at a value between 96 and 128 depending on the ratio of pixels contained in the low intensity range of bins 24 up to the variable PeakMid to the total number of pixels in the input digital image 20 (step 322) according to the following formula:

$$\text{StretchPoint} = 96 + 32 * ((\text{\#Pixels in Bin Range up to PeakMid}/\text{\#Pixels in Image})) \quad (2)$$

With the variable PeakMid less than 64 and the variable StretchPoint in the range of 96 to 128, the variable StretchPoint is used to stretch pixels contained in the low intensity range of bins 24 having intensity values below the value of the variable PeakMid, out to between 96 and 128 as will be further described.

At step 320, if the variable PeakEnd is greater than 128, the variable PeakMid is set to a value of 96, and the variable StretchPoint is set to a value of 128 (step 324). With the variable PeakMid set to 96 and the variable StretchPoint set to 128, the variable StretchPoint is used to stretch pixels contained in the low intensity range of bins 24 having intensity values below 96 out to 128 resulting in a subtle increase in the intensities of low intensity pixels as will be further described.

Figure 5:
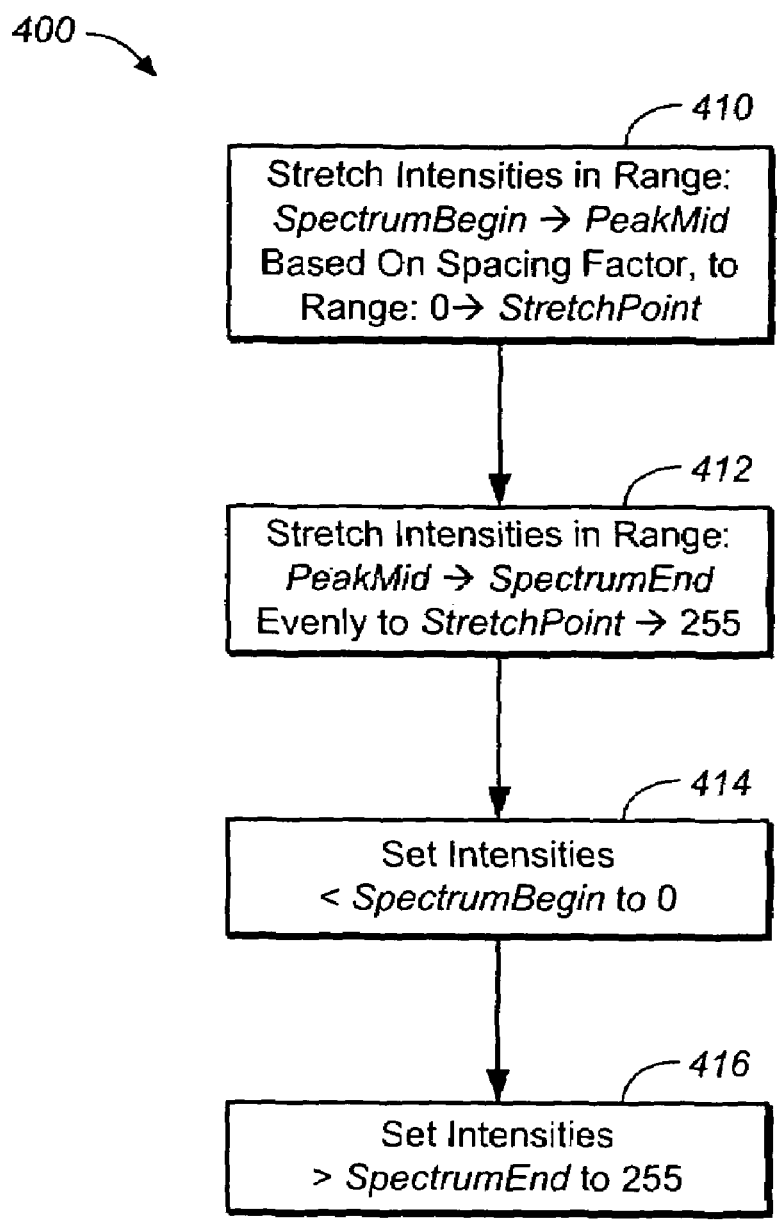
FIG. 5 is a flowchart showing the steps performed during image intensity adjustment.

With reference to FIG. 5, the steps performed during pixel intensity adjustment based on the determined mapping parameters are shown. During step 400, the intensities of the pixels in the range SpectrumBegin→ PeakMid are stretched out to the value of the variable StretchPoint (step 410). As described above, the value of the variable StretchPoint is dependent on the nature of the intensity distribution histogram 22. To produce additional distinction between large amounts of similar low intensity pixels in the range SpectrumBegin→ PeakMid, the ratio of pixels at each intensity to the total number of image pixels is taken into account prior to remapping. The following exponential formula is used:

$$\text{Exp}\{-(1-x)\} \quad (3)$$

where:

$x = (\text{\# of pixels for each intensity})/(\text{\# of pixels in the image})$ For each intensity in the range 0→ PeakMid, a spacing factor is calculated using equation (3). The spacing factors for all of the intensities are summed, and a re-mapped intensity value is calculated for each intensity based on normalizing the sum of spacing factors to a range of 0→ StretchPoint.

Pixels having intensities in the range PeakMid→ SpectrumEnd are evenly re-distributed such that they are re-mapped to a range StretchPoint→ 255 (step 412). Any pixel having an intensity that is less than SpectrumBegin is set to 0 (step 414), and any pixel having an intensity that is greater than SpectrumEnd is set to 255 (step 416).

As will be appreciated, pixel intensity adjustments in the input digital image are based on features of a low intensity pixel range in the intensity distribution of pixels forming the image. Making intensity adjustments in the manner ensures that the intensity adjustments are directed to the portions of the image requiring it. Furthermore, overcompensation (i.e., overadjustments in brightness or contrast), something that is common in prior art methods that automatically stretch the entire range of image pixels between SpectrumBegin and SpectrumEnd out to 0→ 255, is reduced.

FIGS. 7 to 10 show input digital images, the intensity distribution histograms of the pixels forming the input digital images, output digital images after undergoing contrast enhancement and the intensity distribution histograms of the pixels forming the output digital images.

Figure 7:
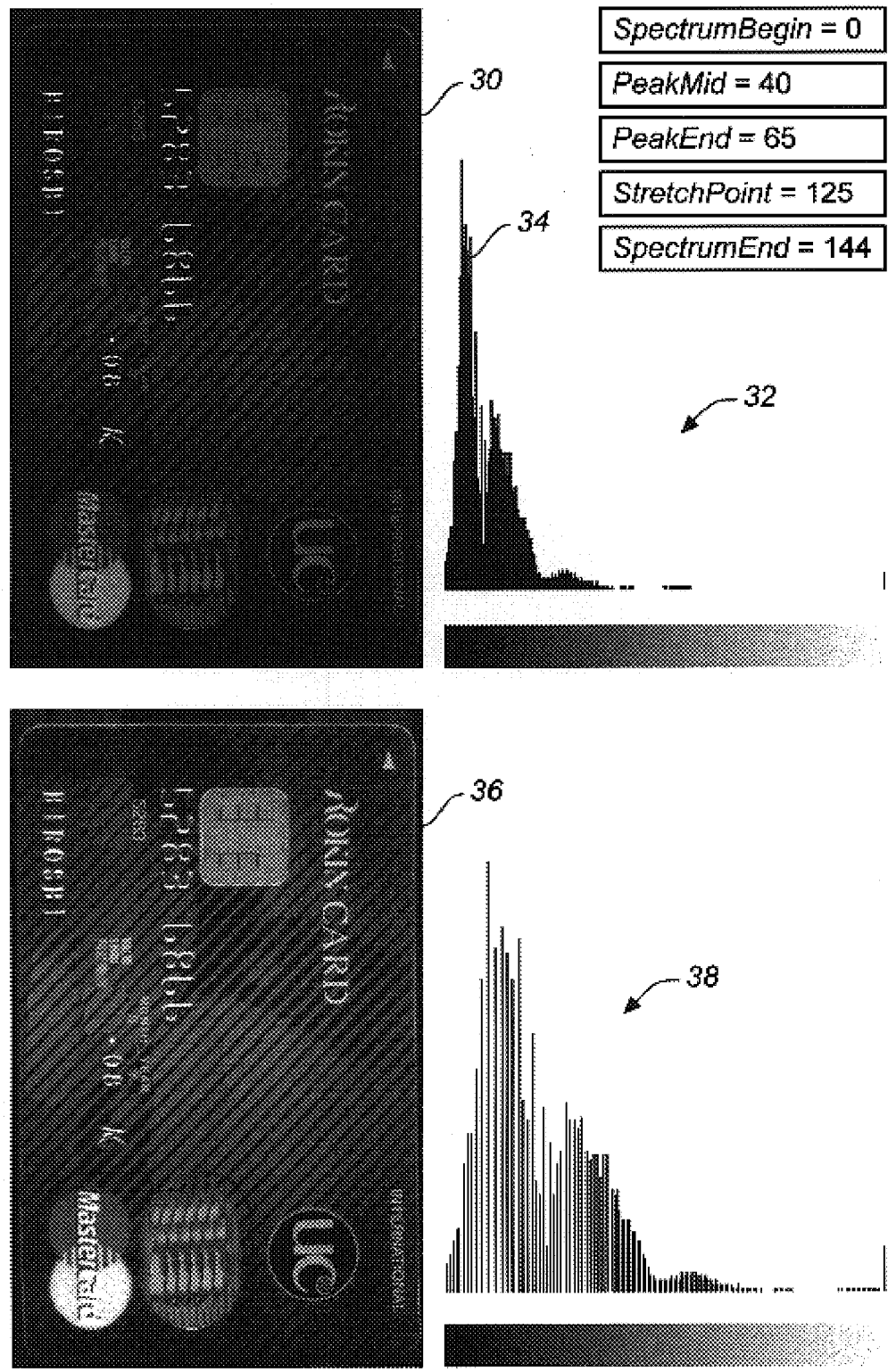
FIG. 7 shows the input digital image and the intensity distribution histogram of FIG. 6 together with an output digital image of the scanned payment card having undergone contrast enhancement and an intensity distribution histogram of the pixels forming the output digital image.

In FIG. 7, the input digital image 30 is of a credit card having an intensity distribution histogram 32 with a low intensity range of bins 34. During steps 100 and 200, the variable SpectrumBegin is determined to be 0, the variable PeakMid is determined to be 40, the variable PeakEnd is determined to be 65 and the variable SpectrumEnd is determined to be 144. At step 300, because the variable PeakMid is less than 64 and the variable PeakEnd is in the range of 64 to 128, the variable PeakMid is not re-assigned. The variable StretchPoint is set to 125 because the ratio of pixels contained in the low intensity range if bins 34 up to the variable PeakMid to the total number of image pixels is approximately 0.906. Using these mapping parameters during step 400 yields the output image 36 having the intensity distribution histogram 38.

Figure 8:
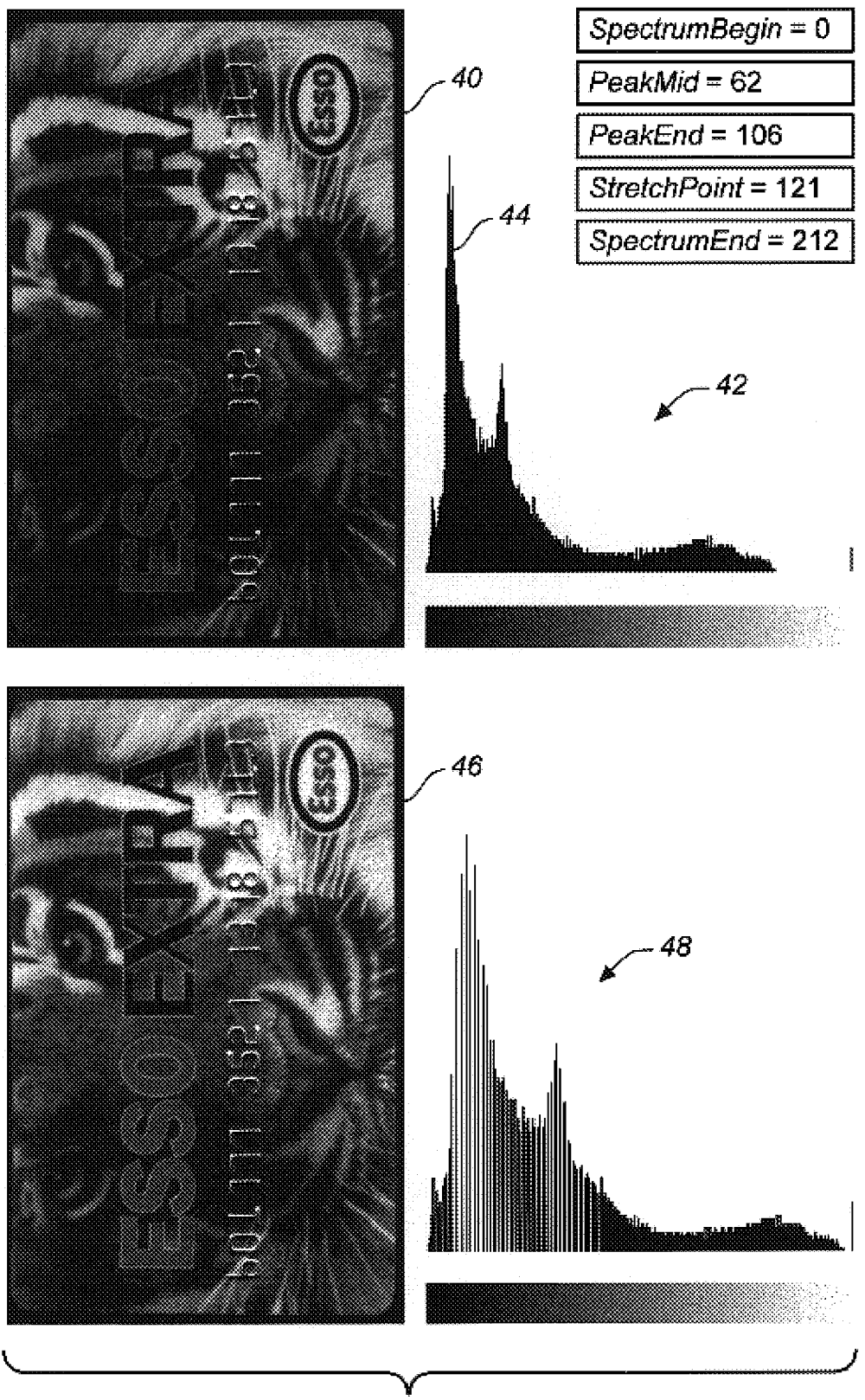
FIG. 8 shows another input digital image of a scanned payment card having embossed characters, an intensity distribution histogram of the pixels forming the input digital image, an output digital image having undergone contrast enhancement and an intensity distribution histogram of the pixels forming the output digital image.

In FIG. 8, the input digital image 40 is of a points card having an intensity distribution histogram 42 with a low intensity range of bins 44. During steps 100 and 200, the variable SpectrumBegin is determined to be 0, the variable PeakMid is determined to be 62, the variable PeakEnd is determined to be 106 and the variable SpectrumEnd is determined to be 212. At step 300, because the variable PeakMid is less than 64 and the variable PeakEnd is between 64 and 128, the variable PeakMid is not re-assigned. The variable StretchPoint is set to 121 because the ratio of pixels contained in the low intensity range of bins 44 up to the variable PeakMid to the total number of image pixel is approximately 0.781. Using these mapping parameters during step 400 yields the output image 46 having the intensity distribution histogram 48.

Figure 9:
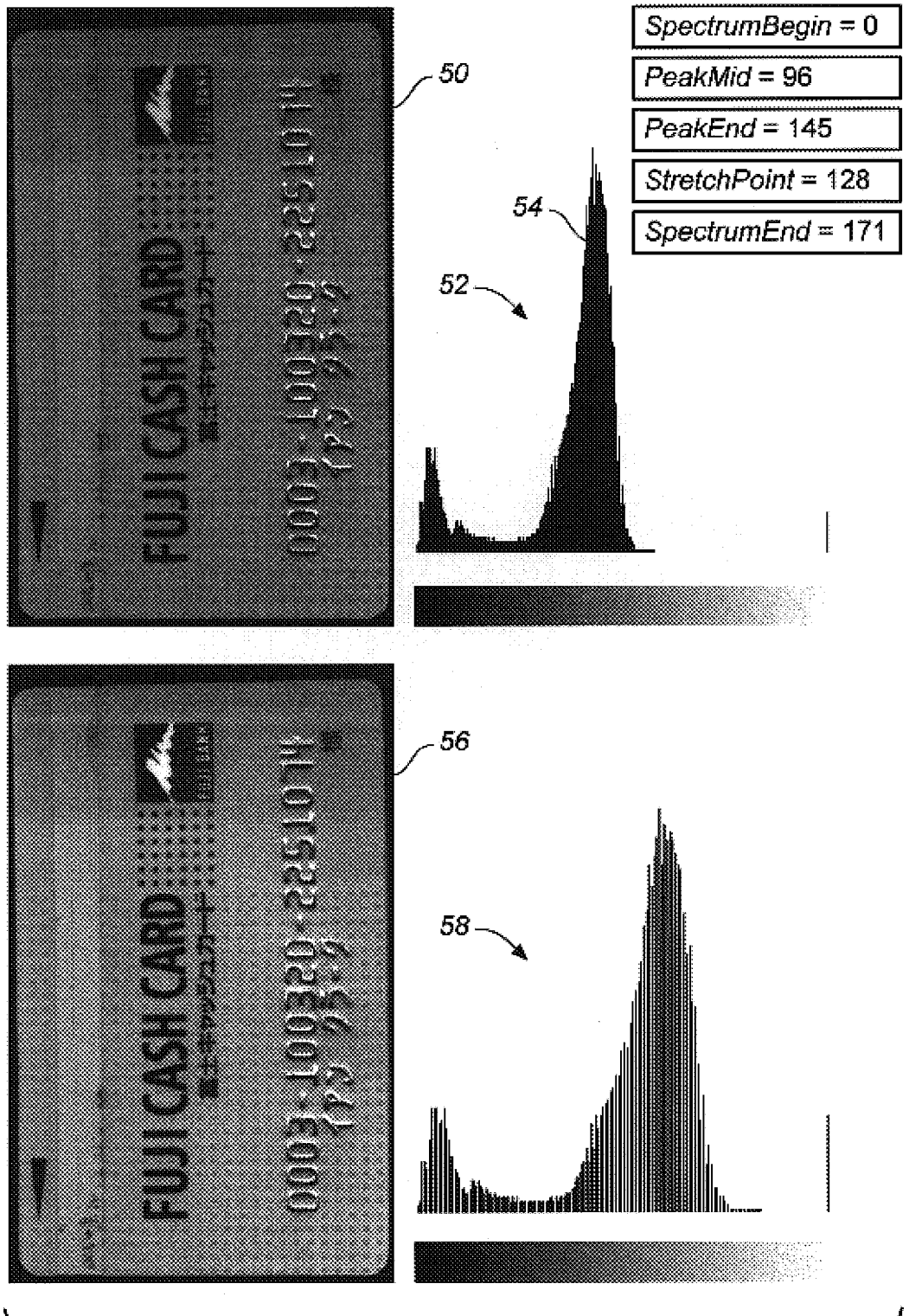
FIG. 9 shows yet another input digital image of a scanned payment card having embossed characters, an intensity distribution histogram of the pixels forming the input digital image, an output digital image having undergone contrast enhancement and an intensity distribution histogram of the pixels forming the output digital image.

In FIG. 9, the input digital image 50 is of a cash card having an intensity distribution histogram 52 with a low intensity range of bins 54. During steps 100 and 200, the variable SpectrumBegin is determined to be 0, the variable PeakMid is determined to be 96, the variable PeakEnd is determined to be 145 and the variable SpectrumEnd is determined to be 171. At step 300, because the variable PeakMid is between 64 and 128, the variable PeakMid is not re-assigned. The variable StretchPoint is set to 128. Using these mapping parameters during step 400 yields the output image 56 having the intensity distribution histogram 58 results.

Figure 10:
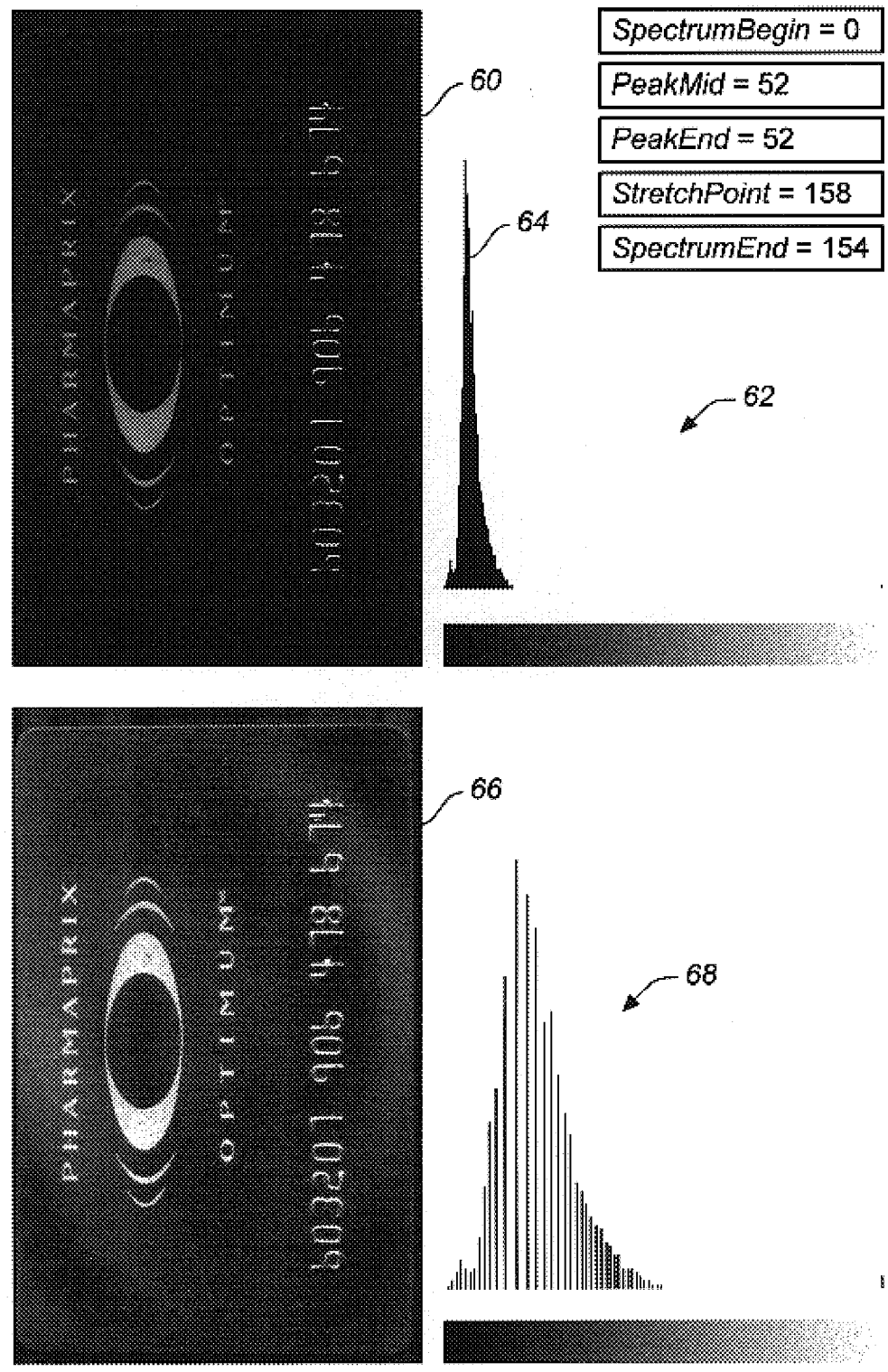
FIG. 10 shows still yet another input digital image of a scanned payment card having embossed characters, an intensity distribution histogram of the pixels forming the input digital image, an output digital image having undergone contrast enhancement and an intensity distribution histogram of the pixels forming the output digital image.

In FIG. 10, the input digital image 60 is of a loyalty card having an intensity distribution histogram 62 with a low intensity range of bins 64. During steps 100 and 200, the variable SpectrumBegin is determined to be 0, the variable PeakMid is determined to be 52, the variable PeakEnd is also determined to be 52 and the variable SpectrumEnd is determined to be 154. Because both the variables PeakMid and PeakEnd are both less than 64, the variable PeakMid is set to the value of the variable PeakEnd. The variable StretchPoint is set to 158 because the ratio of pixels contained in the low intensity range of bins 64 to the total number of image pixels is approximately 0.938. Using these mapping parameters during step 400 yields the output image 66 having the intensity distribution histogram 68.

While the variables PeakMid and PeakEnd have been chosen as feature points upon which to base a determination of mapping parameters, it will be understood that other features may be employed. A width of the bin range may be employed as part of a StretchPoint formula to base mapping parameters partly on the shape of the pixel counts over the bin range. Also other criteria for determining PeakMid that do not use the 85% percentile mark may be employed.

Furthermore, the low and medium pixel values to which the variable PeakMid is compared during step 300 may be adjusted based on the preferences of a user, or automatically. Also, it is contemplated that pixels in more than one bin range may be stretched or compressed during re-mapping. Furthermore, while four sets of re-mapping parameters have been proposed, it will be appreciated that more or fewer sets of re-mapping parameters may be employed to achieve the desired contrast enhancement for particular applications.

While an exponential formula has been used for determining spacing factors for spreading pixel intensities in the 0→StretchPoint range, it will be understood that other formulas may be employed. For instance, the linear formula y=0.4+0.6x would work in a similar manner to spread the pixels in bins having high counts, where x is the same ratio as described with reference to equation 3.

Although embodiments have been described, those of skill in the art will appreciate that variations and modifications may be made without departing from the spirit and scope thereof as defined by the appended claims.

What is claimed is:

1. A method of increasing contrast in a digital image comprising:
    determining an intensity distribution of pixels forming said digital image;
    identifying a low intensity pixel range in said distribution;
    adjusting intensities of pixels in said image wherein: during said adjusting, pixel intensities are stretched thereby to space pixels at different intensities apart; the low intensity pixel range includes a predominate number of the low intensity pixels in said image; during said adjusting, at least a portion of the pixels in said low intensity pixel range are re-scaled; during re-scaling, pixels having intensity values in a specified range are stretched towards a threshold value; when the threshold intensity value is above a designated value, pixels having intensities above said low intensity pixel region are re-scaled; the threshold intensity value is positioned such that 85% of the pixels in the low intensity pixel range have an intensity value that is less than the threshold intensity value; pixels forming said image have intensity values in the range of 0 to 255 and wherein said designated value is equal to 128; when the threshold intensity value is below the designated value, pixels in said low intensity pixel range are adjusted; and when the threshold intensity value is less than 64, pixels in the low intensity pixel range are stretched out either to between 128 to 160 or 96 to 128 depending on the upper pixel intensity value of the low intensity pixel range; and based on at least one feature of said low intensity pixel range, adjusting intensities of pixels in said image.

2. The method of claim 1, wherein when the upper pixel intensity value is less than 64, the pixels in the low intensity pixel range are stretched out to between 128 and 160 and when the upper pixel intensity value is in the range of 64 to 128, the pixels in the low intensity pixel range are stretched out to between 96 and 128.

* * * * *